(12) United States Patent
Baum et al.

(10) Patent No.: US 10,229,210 B2
(45) Date of Patent: Mar. 12, 2019

(54) SEARCH QUERY TASK MANAGEMENT FOR SEARCH SYSTEM TUNING

(71) Applicant: ORACLE INTERNATIONAL CORPORATION, Redwood Shores, CA (US)

(72) Inventors: John Baum, Thousand Oaks, CA (US); Manish Verma, Cupertino, CA (US); Katherine W. Ward, Kensington, MD (US); Guigen Zhang, Pleasanton, CA (US); Qian Jiang, San Francisco, CA (US); Rodney Garling, Jr., Camas, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 507 days.

(21) Appl. No.: 14/963,563

(22) Filed: Dec. 9, 2015

(65) Prior Publication Data
US 2017/0169111 A1    Jun. 15, 2017

(51) Int. Cl.
*G06F 17/30* (2006.01)

(52) U.S. Cl.
CPC .... *G06F 17/30867* (2013.01); *G06F 17/3053* (2013.01); *G06F 17/30306* (2013.01)

(58) Field of Classification Search
CPC ......... G06F 17/30867; G06F 17/30761; G06F 17/3053; G06F 17/30306
USPC ................................................ 707/706, 723
See application file for complete search history.

(56) References Cited

U.S. PATENT DOCUMENTS

| | | | |
|---|---|---|---|
| 7,349,901 B2* | 3/2008 | Ramarathnam | G06F 17/30867 707/706 |
| 7,716,218 B1 | 5/2010 | Pogue | |
| 7,895,181 B2 | 2/2011 | Shaw et al. | |
| 8,131,716 B2* | 3/2012 | Chevalier | G06F 17/30545 707/723 |

(Continued)

OTHER PUBLICATIONS

Baum, John, Search Query Tuning Demonstration presented at Oracle Open World, pp. 1-15; Sep. 30, 2012, (selected screenshots included); Oracle International Corp., Redwood Shores, CA.

(Continued)

*Primary Examiner* — Phong H Nguyen
(74) *Attorney, Agent, or Firm* — Kraguljac Law Group, LLC

(57) ABSTRACT

Systems, methods, and other embodiments associated with search query task management for search system tuning are described. In one embodiment, a method includes receiving interaction data that describes an interaction with a search system. The search system includes a search engine configured to process search queries to return results that include a ranked set of documents that are relevant to respective search queries. A search query to be used as a basis for search engine tuning is identified based on at least the interaction data. Request data describing a tuning request for the identified search query is transmitted to a search query tuning system. In response to the tuning request for the identified search query, the search query tuning system adds the identified search query to a set of search queries that are candidates for use as a basis for search engine tuning.

19 Claims, 6 Drawing Sheets

(56) References Cited

U.S. PATENT DOCUMENTS

| | | | |
|---|---|---|---|
| 8,984,012 B2* | 3/2015 | Ramsey | G06F 17/30864 |
| | | | 707/687 |
| 2006/0004748 A1* | 1/2006 | Ramarathnam | G06F 17/30867 |
| | | | 707/E17.109 |
| 2007/0106659 A1* | 5/2007 | Lu | G06F 17/30554 |
| | | | 707/E17.089 |
| 2007/0266025 A1* | 11/2007 | Wagner | G06F 17/30867 |
| | | | 707/E17.109 |
| 2009/0210403 A1* | 8/2009 | Reinshmidt | G06F 17/30867 |
| | | | 707/E17.109 |
| 2013/0110824 A1 | 5/2013 | DeRose et al. | |
| 2015/0127637 A1 | 5/2015 | Cavanagh et al. | |
| 2016/0117727 A1* | 4/2016 | Campbell | G06Q 30/0256 |
| | | | 705/14.54 |

OTHER PUBLICATIONS

Coveo Solutions Inc.; Coveo for Sitecore, pp. 1-4; downloaded Aug. 24, 2015 from: http://www.coveo.com/en/solutions/coveo-for-sitecore.

Coveo Solutions Inc.; Coveo for Salesforce, pp. 1-5; downloaded Aug. 24, 2015 from: http://www.coveo.com/en/solutions/coveo-for-salesforce/service-cloud#videosAndImages.

Microsoft; In-Place eDiscovery: Exchange 2013 Help, pp. 1-9, downloaded Aug. 24, 2015 from: https://technet.microsoft.com/en-us/library/dd298021(v=exchg.150).aspx.

* cited by examiner

US 10,229,210 B2

SEARCH QUERY TASK MANAGEMENT FOR SEARCH SYSTEM TUNING

BACKGROUND

Search systems provide a way for users to access a knowledge database that stores a large number of documents. A user seeking an answer to a specific question, such as a customer using a web portal or a customer service agent responsible for answering questions from the general public, enters a search query describing the question to the search system. The search system includes a search engine that returns a set of ranked documents in response to the search query. The documents are ranked according to a predicted relevance to the search query. The quality of the user's experience is related to the user's perceived relevance of the documents to the user's question. To this end, knowledge providers often "tune" search engines to return documents in response to a search query that are more relevant to the user's question than the documents returned by the original (i.e., "un-tuned") search engine.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

A search system's search engine includes a set of dictionary data and search configurations, and search rules that define how the search engine processes search queries. In order to provide search results that are relevant, accurate, and up-to-to date, the search engine should be tuned on a regular basis. For the purposes of this description, "tuning" a search engine means updating the dictionary data, the search configurations, and/or the search rules in a manner that improves the results, as measured by some quality metric, returned by the search engine.

Traditional search engine tuning is performed by exposing the dictionary data, search configurations, and search rules for manual modification by a system administrator or other user. Direct manual tuning is a very technical and delicate process which relies on knowledge of the inner workings of the search engine. Unfortunately, companies that utilize a search system often do not have personnel who are familiar with both the inner workings of the search engine and the concepts captured by the documents in the knowledge database, which hinders tuning efforts.

Search engine tuning may be performed with respect to one or more particular search queries. For the purposes of this description, tuning a search engine with respect to a given search query means tuning the search engine in a manner that improves the results returned by the search engine in response to given search query. During this type of tuning, a selected search query is submitted to the search engine (or a "tuning" search engine that mimics the search engine being tuned) and, in response, a first set of ranked documents is returned. The dictionary data and/or the search configuration are modified in an attempt to improve the results. The selected search query is then submitted to the modified search engine which returns a second set of ranked documents. A comparison is made as between the first set of documents and the second set of documents based on some quality metric (e.g., search score, position of results in an index, click counts for documents). If the second set of documents has a higher quality, then the modification to the search engine may be adopted by the search system.

Of course, changes made to the search engine that improve results for one search query may degrade results for another search query. Thus, the selection of search queries used to tune a search engine is important to achieving a properly tuned search engine that provides timely, accurate, and relevant results. Systems and methods are described herein that identify search queries that are likely to provide a good basis for search engine tuning based on various types of interactions occurring with the search system. In this manner, the tuning of the search engine can be guided by the actual use of the search system, improving the results provided by the search system.

Figure 1:
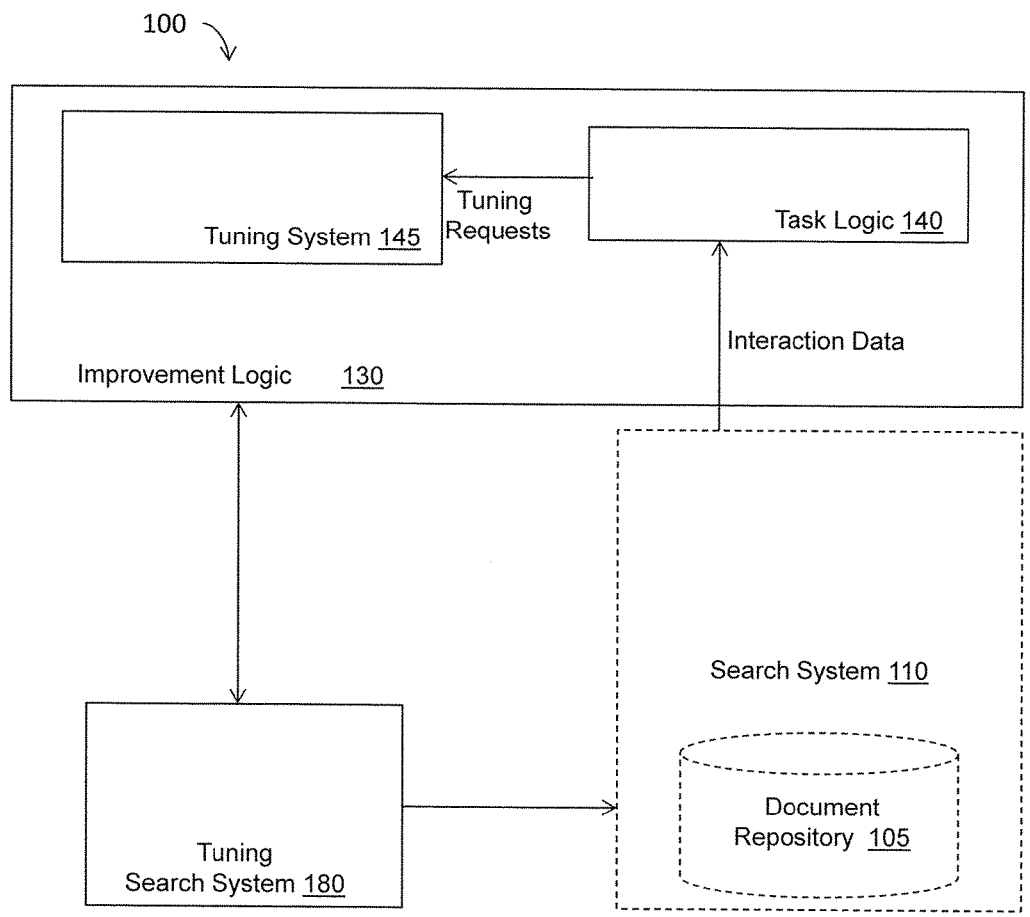
FIG. 1 illustrates one embodiment of a system associated with search query task management for search system tuning.

With reference to FIG. 1, one embodiment of a search query tuning system 100 configured to tune a search system 110 to improve search results with respect to selected search queries is illustrated. The search system 110 is configured to process search queries to return results that include a ranked set of documents selected from a document repository 105. Entities who submitted the search queries interact with the results by clicking (i.e. "opening") certain of the documents and/or rating their satisfaction with the results. Other entities interact with the search system 110 to add content to the content repository 105 or make other changes to the search system that affect the performance of the search system (see FIG. 2, content logic 290).

As used herein, an "entity" is a computing device (e.g., mobile phone, computer, and so on) under the control of person who has composed a search query or is otherwise interacting with the search system. The entity may be any computing device or system that is capable of transmitting search queries or other communications, via a network connection, to the search system 110. Examples of persons who may compose search queries include members of the general public visiting a company's customer service web page or customer service agents accessing the search system to answer requests for technical assistance.

The search query tuning system 100 includes improvement logic 130 and a tuning search system 180. The tuning search system 180 is configured to mimic the operation of the search system 110. Modifications such as revisions to the search engine's dictionary, configuration, and rules are made to the tuning search system and search queries can be processed by the modified tuning search system to return a new set of results. Changes to the tuning search system 180 that produce better results than the search system as originally configured are also made to the search system 110 during periodic synchronization.

The improvement logic 130 is configured to receive interaction data describing various types of interactions that occur with respect to the search system 110 during the search system's normal operation. Interaction data includes data describing search queries submitted to the search system, document clicks (i.e., each incidence of a document being clicked or selected by a user), search result ratings, or content being added to the search system. The improvement logic 130 includes task logic 140 that is configured to identify a search query that is a good candidate to be used as a basis for search system tuning based on at least the interaction data.

Once a search query is identified for use in tuning, the task logic 140 transmits request data describing a tuning request for the identified search query to a tuning system 145. In response to receiving the tuning request the tuning system 145 adds the identified search query to a set of search queries that are candidates for use as a basis for future search system tuning. During the next tuning of the search system, the set of search queries is displayed or otherwise presented to the entity performing the tuning. Having a set of search queries that have been identified as good candidates for search system tuning based on real life interactions with the search system greatly facilitates effective tuning of the search system 110.

In one embodiment, the search system tuning system 100 is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the tuning system is a centralized server-side application that provides at least the functions disclosed herein and that is accessed by many users via computing devices/terminals communicating with the search system tuning system 100 (functioning as the server) over a computer network.

Figure 2:
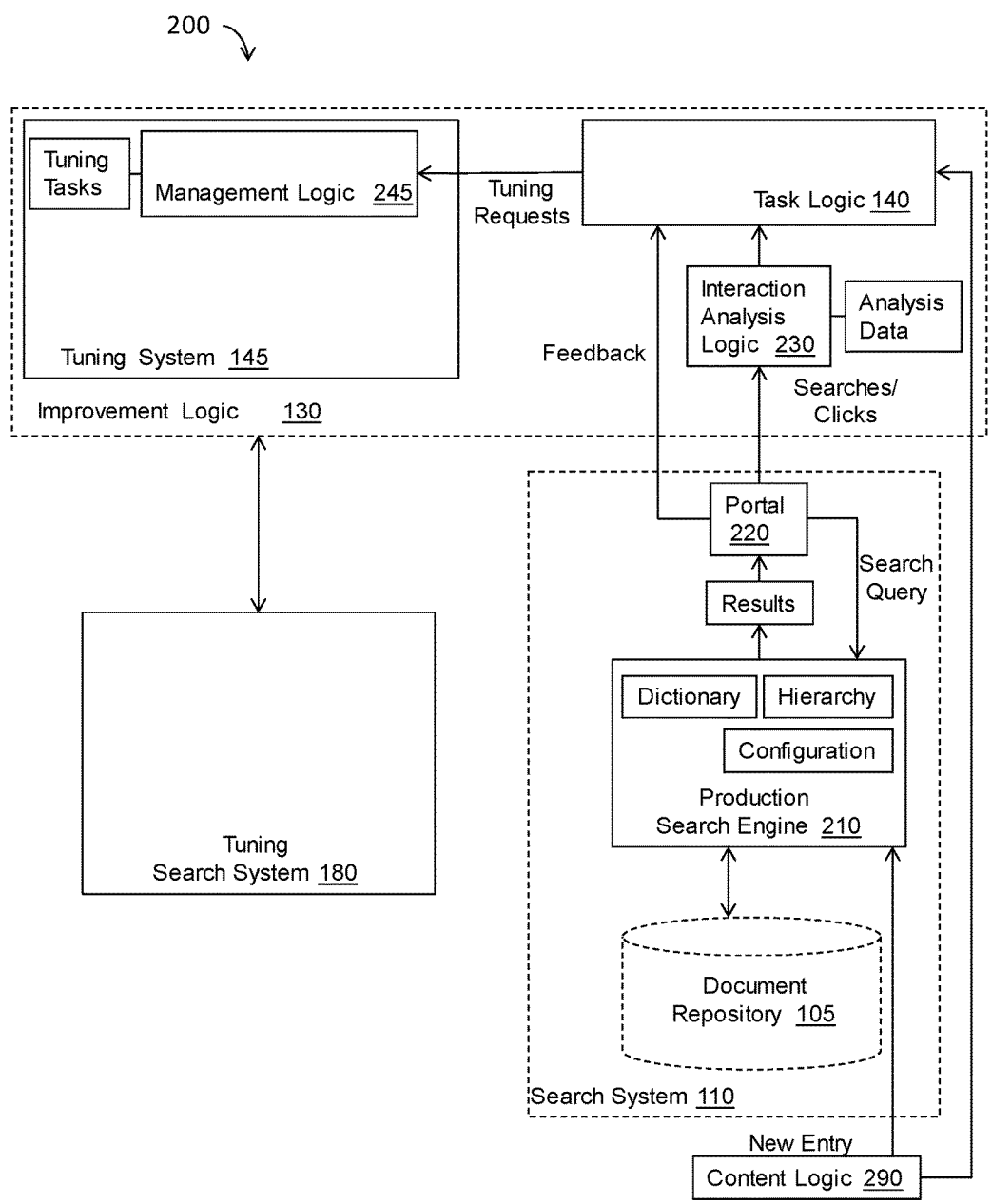
FIG. 2 illustrates another embodiment of a system associated with search query task management for search system tuning.

Turning now to FIG. 2, a search query tuning system 200 that includes one particular embodiment of the search system 110, the improvement logic 130, and the tuning search system 180 is illustrated. The search system 110 includes the document repository 105 (e.g., database), a production search engine 210, and a portal 220.

The production search engine 210 includes dictionary data that stores data used by the search engine to defines search terms. For the purposes of this description, a "search term" is a word or term that is included in a search query. In one embodiment, the dictionary data includes synonym data that identifies words that are to be considered synonyms for search terms as well as data that describes how search terms should be stemmed to create additional search terms. The search engine 210 may augment a search query with synonyms or stemmed versions of the search terms in the search query.

The production search engine 210 includes configuration data that describes data structures, such as indexes, that aid the search engine in efficiently processing search queries. For example, configuration data may include an index that indexes documents based on common search terms. As new search terms become prevalent and other search terms are no longer used, the configuration data should be adapted to handle the new search terms.

Entities submit search queries by way of the portal 220. In one embodiment, the portal 220 is a web portal accessed by way of an Internet connection. The portal 220 may also a workstation with a local network connection to the production search engine 210. Entities submit search queries and receive results via the portal 220. Entities interact with the results by way of the portal 220 by clicking on documents and scrolling through and/or printing selected documents.

Interaction analysis logic 230 monitors interactions with the search system 110 that occur by way of the portal 220. The interaction analysis logic 230 records analysis data that describes search queries that are submitted to the search engine 210, documents that are returned in response to respective search queries, and which documents are clicked.

Content logic 290 is configured to add or modify content in the search system 110. In one embodiment, the content logic 290 is configured to receive entry data, such as entry data identifying a new product, and insert the entry data into a hierarchy used by the search engine to process search queries. The hierarchy defines relationships between entries corresponding to products and concepts described by the documents in the document repository 105. For example, the hierarchy for a given company's search system might include two main entries: phones and televisions. The phone entry might include sub-branches for cordless phones and cell phones. The cell phone entry might include sub-branches for each type of cell phone sold by the company, and so on. The search engine 210 uses the hierarchy when processing search queries. In one embodiment, when sufficient search results are not found for a search query that includes search terms found in one level of the hierarchy, the search engine augments the results with documents relevant to an entry in a higher level of the hierarchy.

The task logic 140 receives interaction data from the portal 220, the interaction analysis logic 230, and the content logic 290. Based on the interaction data, the task logic 140 transmits tuning requests for search queries that are determined to be good candidates for search system tuning. Management logic 245 creates a tuning task for each search query that is the subject of a tuning request and stores a set of tuning tasks for use in guiding subsequent tuning efforts.

In one embodiment, the task logic 140 receives interaction data describing user feedback from the portal 220. The user feedback includes a search result rating assigned to a search query by an entity that submitted the search query. The task logic 140 is configured to compare the rating (e.g., number of "stars") to a threshold. When the task logic 140 determines that the rating is less than the threshold, the task logic 140 transmits request data describing a tuning request for the search query that is the subject of the feedback to the search query tuning system 180. In this manner, search queries that have been explicitly characterized as producing inferior results by a user of the search system are automatically identified as good candidates for search system tuning.

The task logic 140 receives interaction data from the content logic 290 that describes new products or concepts that are added as entries to a hierarchy. Recall that the hierarchy is used by the search system 110 to process the search queries. The task logic 140 is configured to evaluate the new entry against certain criteria. Example criteria specify a minimum level of significance in the hierarchy and a maximum number of matching terms in the dictionary. When the criteria are met, the task logic 140 generates a search query that includes the new entry and transmits request data describing a tuning request for the generated search query to the search query tuning system. The search query may include the name of the new entry or any or all search terms in the new entry. In this manner, search queries are generated for new entries to the hierarchy that may result in search queries for which the search engine 210 has not yet been tuned. The search queries can be used to preemptively tune the search system 110 before a user experiences poor results from a search query on a new entry.

The task logic 140 receives interaction data from the interaction analysis logic 230 describing how entities interacted with the search system 110 by way of the portal 220. In one embodiment, the analysis logic 230 is embodied as a scheduled batch job that accesses search data (not shown) that records search query related operations that were performed through the portal 220. The analysis logic 230 stores data corresponding to search queries recently submitted to the search system 110 in the analysis data. The analysis logic 230 also retrieves a click count and a case link count for each document that was returned to the search queries in a set of results. Throughout this description, the click count and case link count for a document will be referred to, collectively, as "document data" for the document.

For the purposes of this description, a "case link" is a flag or other identifier that is set by a customer service agent that links a particular document to a given search query or customer service "case" (e.g., a set of interactions with a customer in a given session). For example, a customer service agent who finds a document particularly helpful when answering a customer's request for technical assistance can link the document to the case. When the case is reopened (e.g., the customer calls back) or a similar case is opened (e.g., another customer with the same question), the customer service agent uses the case link to readily identify the relevant document.

The task logic 140 analyzes the analysis data to identify search queries that are good candidates for search system tuning. In one embodiment, the task logic 140 identifies, as good candidates for tuning, search queries in which no documents in the results were clicked. In one embodiment, the task logic 140 identifies, as good candidates for tuning, search queries in which documents that were clicked were not ranked above a threshold ranking. In this manner, search queries that returned results sets in which highly ranked documents were not selected by a user are automatically identified as good candidates for tuning.

In one embodiment, the interaction analysis logic 230 provides an interface (not shown) by which a search system analyst may search the analysis data to perform search system analysis. The interface also provides functionality that can be invoked by the analyst to communicate an identified search query to the task logic 140 so that a tuning request for the search query may be generated. This embodiment provides a seamless way for analysts to select search queries discovered during search system analysis to be returning poor results for use in subsequent tuning efforts.

It can be seen from FIG. 2 that the task logic 140 captures interaction data from several sources. The interaction data represents how users are interacting with the search system. The task logic 140 generates tuning requests for search queries that are identified, based on the interaction data, as being good candidates for search system tuning. The management logic 245 creates a tuning task for each search query. In this manner, the tuning system 145 has a set of recommended search queries (e.g., tuning tasks) from which a user may work in subsequent tuning efforts.

Figure 3:
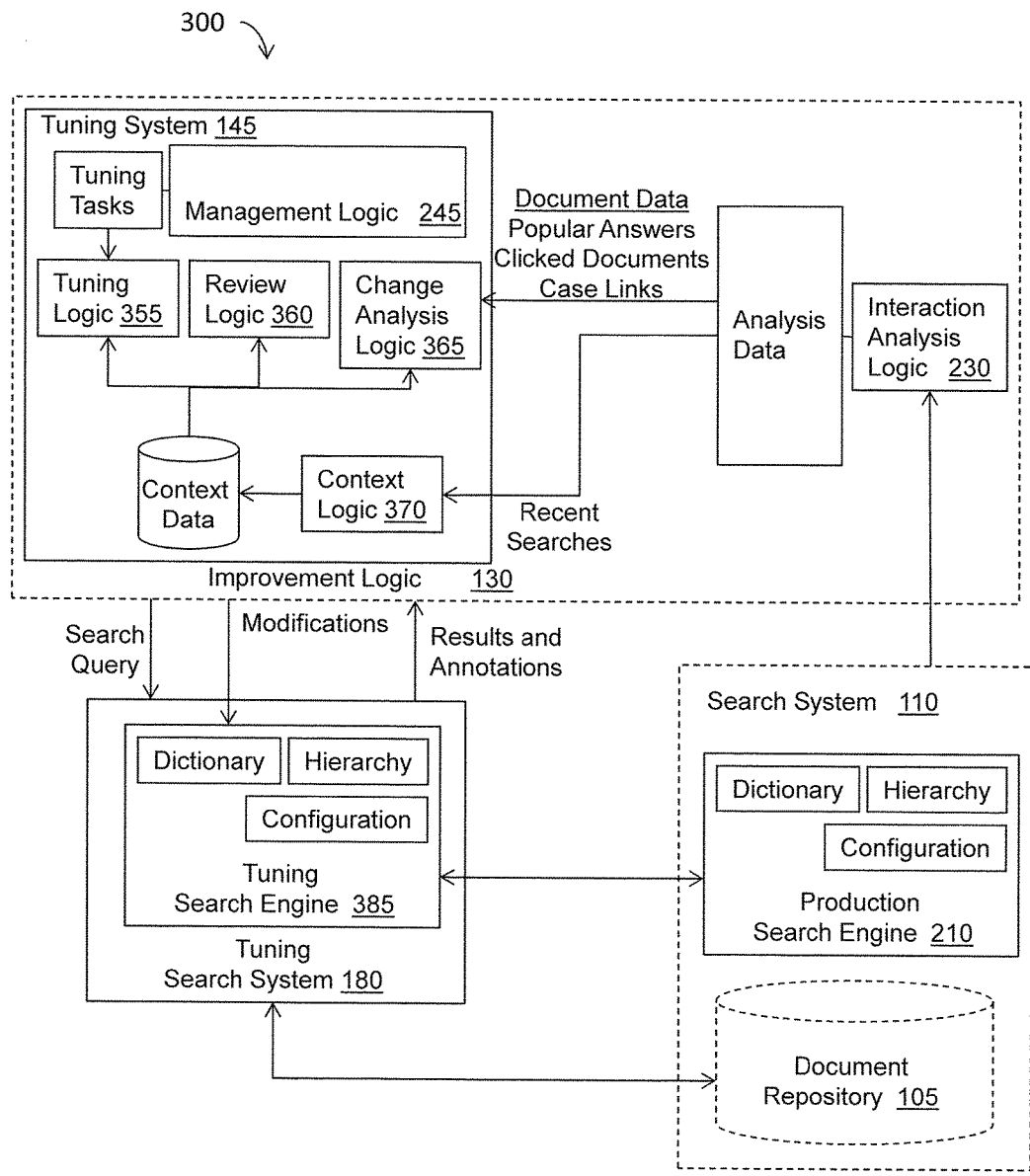
FIG. 3 illustrates one embodiment of a system associated with search system tuning.

Referring now to FIG. 3, a search query tuning system 300 is illustrated that includes a particular embodiment of the tuning system 145, interaction analysis logic 230, and the tuning search system 180. The tuning search system 180 includes a tuning search engine 385 that is configured to mirror the production search engine 210 (i.e., utilize the same dictionary, hierarchy, and configuration data). To this end, the tuning search engine 385 and the production search engine 210 are periodically synchronized. During synchronization, any changes that have been made to the production search engine 210 since the last synchronization are also made to the tuning search engine 385. During synchronization, "published" (i.e., approved) changes that were made to the tuning search engine 385 since the last synchronization are made to the production search engine 210.

The tuning system 145 is configured to submit search queries to the tuning search system 180. The tuning search engine 385 processes the queries in accordance with the dictionary, hierarchy, and configuration data and executes the queries on the document repository 105. The resulting ranked list of documents returned from the document repository 105 to the queries are provided to the improvement logic 130 as will be described in more detail below.

The tuning system 145 includes context logic 370 configured to populate context data with data that describes recent search queries. Recall that the interaction analysis logic 230 identifies recent search queries as part of the regularly performed analysis of search activities. In one embodiment, the context logic 370 accesses the analysis data compiled by the interaction analysis logic 230 and identifies "frequent" search queries that were submitted most frequently (e.g., occurring more than a threshold number of times). The context logic 370 retrieves context data for each frequent search query and stores the context data in the context data.

The context data is a data structure that stores data describing the search query, the documents returned by the search query, and document data for each document in the results. The context data also includes annotation data that describes interpretation steps taken by the production search engine 210 in processing the search query. The context data for the frequent search queries provides valuable context information to an entity tuning the search system 110. In one embodiment, the context logic 370 uses some criteria other than frequency (or no criteria) to select search queries for populating the context data.

The tuning system 145 includes tuning logic 355, review logic 360, and change analysis logic 365. Tuning logic 355 is configured to communicate a list of tuning tasks to an entity engaged in tuning the search system 110. In one embodiment, the tuning logic 355 displays a window that lists the tuning tasks compiled by the management logic 245. In the window, each tuning task includes a search query and a source of the tuning task (e.g., interaction analysis, customer feedback, and so on). The tuning logic 355 provides an interface through which an entity may select a search query from the list of tuning tasks. The tuning logic 355 is configured to submit a selected search query to the tuning search system 180. The tuning search system 180 is configured to process the search query, execute the search query on the document repository, and return, to the tuning logic 355, results (e.g., ranked list of documents) of the search query.

In addition to the results, the tuning search system 180 is configured to return annotations that describe how the tuning search engine 385 interpreted the search query. The annotations are displayed or otherwise communicated to the entity by the tuning logic 355. Each step in interpreting the search query is assigned a token. For example, if a synonym for a search term was added to the search query (e.g., "iPhone" as a synonym for "I-phone") by the tuning search engine 385, an annotation token is displayed for this step in the interpretation process.

A user may examine the annotation tokens and view a detailed reason behind the interpretation step by clicking on an annotation token. Being able to see how the search engine is interpreting various search terms facilitates identifying problems in the search engine's interpretation of a search query. In one embodiment, a suggested action is displayed for each annotation token (e.g., add a particular synonym to a search term) to modify the search engine in a manner that addresses a problem with that particular interpretation step.

In one embodiment, the tuning logic 355 is configured to search the context data to identify recent search queries that have a similar annotation to the search query. The recent search queries have similar annotations provide a context and may help a tuning entity to identify an interpretation problem that affects many search queries in addition to the search query being analyzed. The tuning logic 355 provides an interface through which the tuning entity may edit or modify the tuning search engine 385 by modifying the dictionary, hierarchy, and/or configuration data. The tuning search engine 385, as modified by the tuning logic 355, will be referred to herein as the "modified tuning search engine."

The review logic 360 is configured to execute the search query on the modified tuning search engine in the same manner as the search query was executed on the unmodified tuning search engine by the tuning logic 355. The review logic 360 is configured to display the results and annotations so that the user may compare the results from the modified tuning search engine with the results returned by the unmodified tuning search engine (which are still displayed by the tuning logic 355). Based on the comparison, the tuning entity may determine that the tuning of the search engine produces higher quality results. If the tuning entity determines that the tuning does not produce better results, the tuning entity may interact with the tuning logic 355 again to make different modifications to the unmodified version of the tuning search engine 385 and repeat the tuning and review process just described.

One important challenge to tuning is the tendency to over-tune the search engine with respect to a single search query in a manner that may adversely affect the results of other search queries. To address this challenge, the change analysis logic 365 is configured to present a tuning entity with information regarding the overall impact of the modifications to the tuning search engine that are under consideration. The change analysis logic 365 accesses the analysis data to identify document data for each document in a first set of documents returned in response to a given search query by the unmodified tuning search engine. The change analysis logic 365 also identifies document data for each document in a second set of documents returned in response to the search query by the modified tuning search engine. The change analysis logic 365 computes one or more metrics that communicate whether the second set of documents is of a higher quality based on a respective type of document data.

On possible metric is a "popular answer" metric. For example, if the top five documents in the second set include more documents that were clicked in response to the search query (e.g., "popular answers") than the first set, the "popular answer" metric is assigned a value indicating a positive impact. The magnitude of the metric is related to the magnitude of the difference between the number and ranking of popular answers in the first set of documents as compared to the second set of documents.

Another possible metric is a "clicked documents" metric. For example, if the second set of results includes more "clicked documents" (i.e., documents that were clicked in response to any search query) than the first set, the "clicked document" metric is assigned a value indicating a positive impact. The magnitude of the metric is related to the magnitude of the difference between the number and ranking of clicked documents in the first set of documents as compared to the second set of documents.

Another possible metric is a "case link" metric. For example, if the second set of results includes more documents that were linked to a case (i.e., documents that were linked by a customer service agent to any customer service "case" or interaction with a customer) than the first set, the "case link" metric is assigned a value indicating a positive impact. The magnitude of the metric is related to the magnitude of the difference between the number and ranking of documents linked to a case in the first set of documents as compared to the second set of documents.

The change analysis logic 365 is configured to provide an interface through which a tuning entity may select a search query (e.g., either the search query under consideration or a recent search query selected from the content data) and to display the one or more metrics for the search results returned by the modified tuning search engine in response to the search query. In this manner, the tuning entity may readily see how the search engine modifications under consideration will affect the quality of results to other search queries. If the tuning entity is not satisfied with the results, the tuning entity may interact with the tuning logic 355 again to make different modifications to the unmodified version of the tuning search engine 385 and repeat the tuning, review, and change analysis process just described.

The tuning system 145 provides an interface through which a tuning entity may "publish" modifications to the tuning search engine 385. The published modifications are made to the production search engine 210 in the next synchronization operation.

Figure 4:
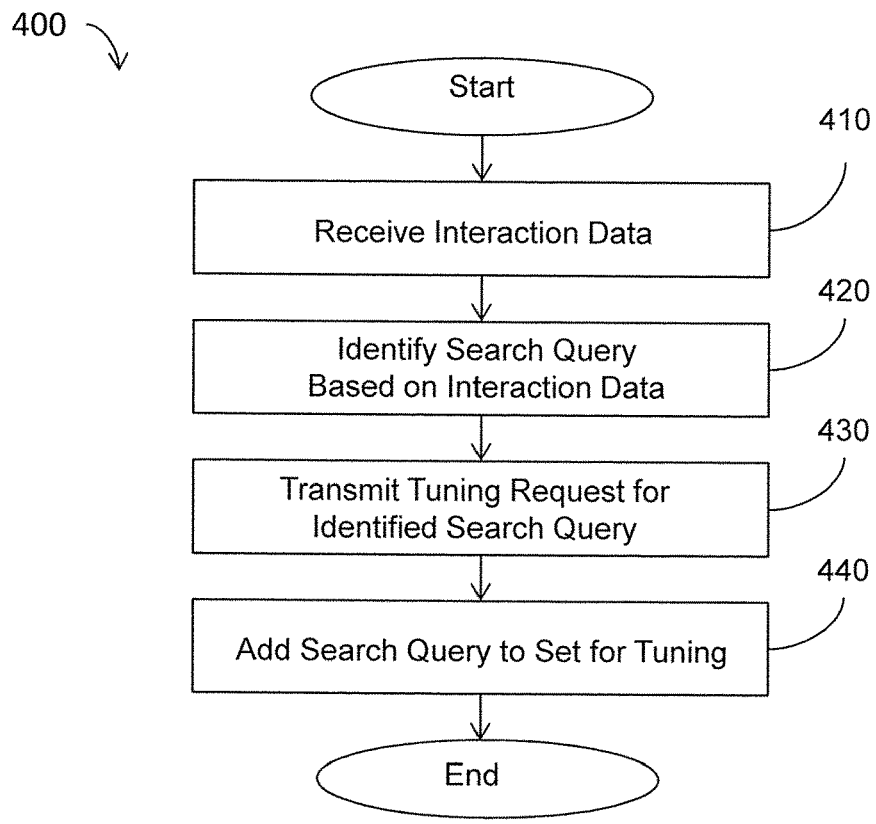
FIG. 4 illustrates an embodiment of a method associated with search query task management for search system tuning.

FIG. 4 illustrates a method 400 associated with compiling a set of search queries for use in tuning a search system. At 410, interaction data is received. Interaction data describes an interaction with a search system. The search system includes a search engine configured to process search queries to return results that include a ranked set of documents that are relevant to respective search queries. In one embodiment, receiving interaction data is performed by the task logic 140 of FIGS. 1-3 controlling a processor to receive interaction data. Receiving interaction data may be performed by receiving data describing interactions between an entity using a portal and the search system. The interaction data may be received by retrieving interaction data from memory that stores data recording search queries entered through the portal, search engine interpretations of search queries, and related information. The interaction data may be received by receiving, over a network connection, a communication from the search system that communicates the interaction data.

At 420, the method includes identifying a search query to be used as a basis for search engine tuning based on at least the interaction data. This step may be performed by the task logic 140 of FIGS. 1-3 controlling a processor to parse and analyze interaction data. The processor is controlled to identify interaction data that meets certain criteria and in turn identifying a search query associated with the interaction data. The interaction data is compared to appropriate thresholds (e.g., number of stars in a customer rating, a new entry's position in a hierarchy, and/or the number or ranking of clicked documents in search query results). When the interaction data meets the criteria, a tuning request is generated by the processor that identifies the search query.

At 430 request data describing a tuning request for the identified search query is transmitted to a search query tuning system. This step may be performed by the task logic 140 of FIGS. 1-3 controlling a processor to transmit the request. The request may be transmitted over a network connection between the task logic 140 and the management logic 245 as shown in FIG. 2.

At 440, in response to the tuning request for the identified search query, the search query tuning system adds the identified search query to a set of search queries that are candidates for use as a basis for search engine tuning. This step may be performed by the management logic 245 of FIG. 2. The search query and associated data may be stored in a data structure (e.g., database table) configured to store tasks for use in tuning efforts. Each record in the data structure may store a respective search query task.

Figure 5:
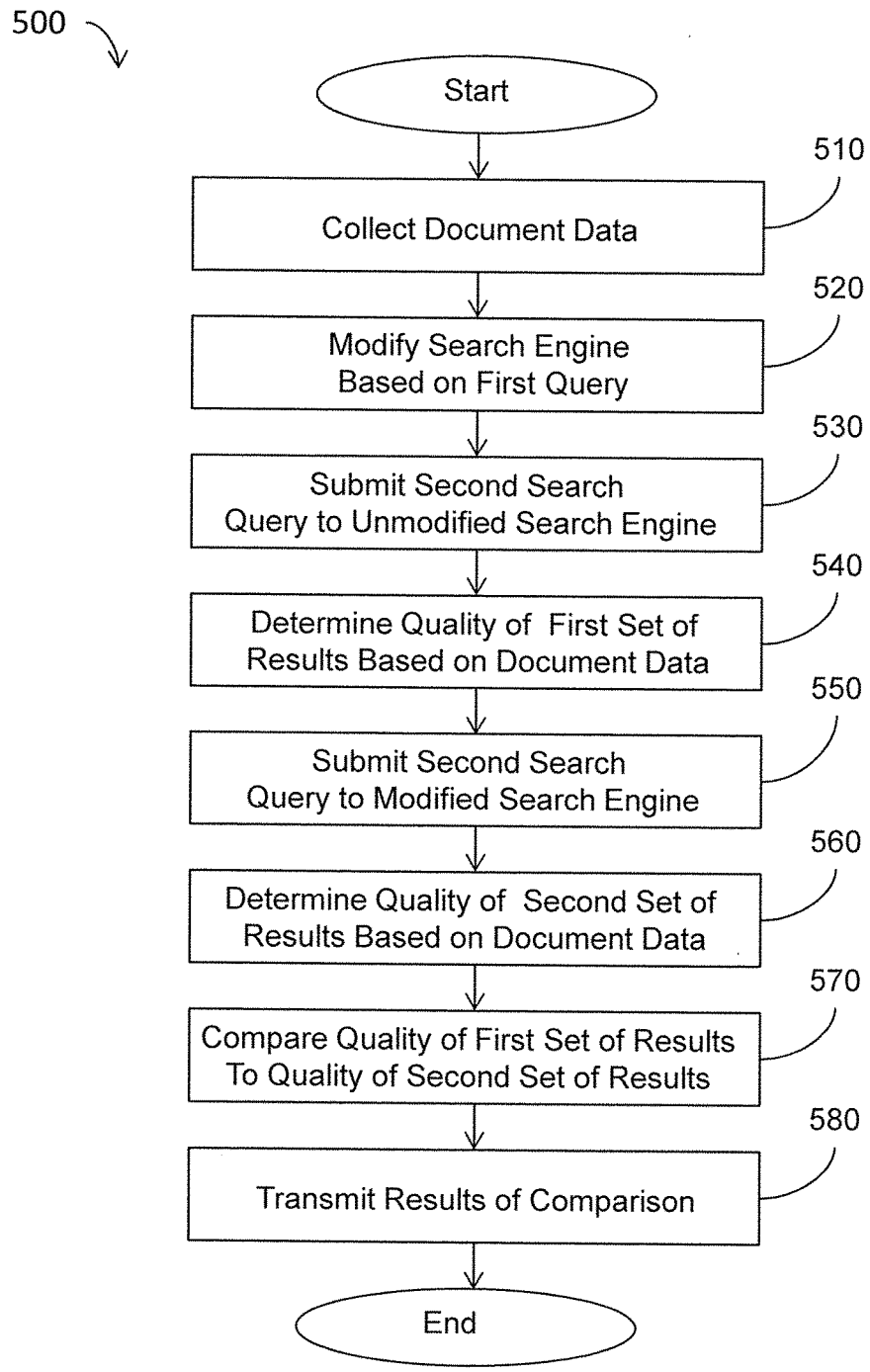
FIG. 5 illustrates an embodiment of a method associated with search system tuning.

FIG. 5 illustrates one embodiment of a system 500 that provides contextual data describing how modifications to a search engine will affect results of other search queries to an entity tuning a search system. At 510, the method includes collecting document data for each document returned in response to search queries submitted to the search system. Document data for a document describes interactions with the document by an entity that submitted a search query that returned the document. Document data may be collected by the interaction analysis logic 230 of FIGS. 2 and 3 controlling a processor. Document data is collected by parsing analysis data that describes user interactions with documents via a portal (e.g., portal 220 of FIG. 2) such as mouse clicks and case links. Mouse clicks and case links are aggregated for each respective document to collect the document data.

At 520, the method includes tuning the search engine with respect to a first search query by modifying a tuning search engine to produce a modified tuning search engine that returns a result comprising a set of documents in response to the search query. The result returned by modified tuning search engine has a higher quality than a result returned by the tuning search engine in response to the search query. Tuning the search engine step may be performed by the tuning logic 355 of FIG. 3 controlling a processor. Dictionary data, configuration data, and/or hierarchy data may be modified to modify the search engine.

At 530, a second search query is submitted to the tuning search engine. This step may be performed by the change analysis logic 365 of FIG. 3 controlling a processor. The second search query is submitted by transmitting a communication over a network connection to a tuning search system.

At 540, the method includes determining a first quality of a first set of ranked documents returned in response to the second search query based on at least document data for the documents in the first set. This step may be performed by the change analysis logic 365 of FIG. 3 controlling a processor. The quality is determined by parsing and analyzing document data for documents in the results set. Criteria are applied to the document data for the documents in the first set. For example, a search score for documents in the first set, a position in an index of documents in the first set, and/or a number of documents in the results set that have document data indicating that the document has been clicked may be tallied as an indicator of the quality.

At 550, a second search query is submitted to the modified tuning search engine. This step may be performed by the change analysis logic 365 of FIG. 3 controlling a processor. The second search query is submitted by transmitting a communication over a network connection to a tuning search system.

At 560, the method includes determining a second quality of a second set of ranked documents returned in response to the second search query based on at least document data for the documents in the second set. This step may be performed by the change analysis logic 365 of FIG. 3 controlling a processor. The quality is determined by parsing and analyzing document data for documents in the second set. Criteria are applied to the document data for the documents in the documents in the second set. For example, a search score for documents in the second set, a position in an index of documents in the second set, and/or a number of documents in the second set that have document data indicating that the document has been clicked may be tallied as an indicator of the quality.

At 570, the first quality is compared to the second quality to produce a comparison result. This step may be performed by the change analysis logic 365 of FIG. 3 controlling a processor. The quality is determined by parsing and analyzing data describing the first quality and the second quality and determining which set of results has a higher quality. For example, the results set that includes documents having a higher search score or includes more documents in a better position in an index and/or having document data indicating that the document has been clicked may be deemed to have a higher quality.

At 580, the method includes transmitting data describing a result of the comparison result to an entity that modified the tuning search engine. This step may be performed by the change analysis logic 365 of FIG. 3. This step may be performed by transmitting data to a display that will render a visual indicator of the relative quality as between the first results set and the second results set on the display.

It can be seen from the foregoing description that the systems and methods described herein provide an end-to-end closed tuning loop that provides suggested search queries for use in guiding tuning efforts. The search queries are obtained from several sources, meaning that a search system may be tuned from different perspectives to provide good results to all users. The systems and methods described herein also provide an entity performing tuning with valuable context information that represents how users are currently interacting with the search system. This allows the tuning entity to make more relevant tuning decisions based on a global perspective of how modifications to the search system will affect the quality of the search system's results to the search queries currently being submitted to the search system.

Computing Device Embodiment

Figure 6:
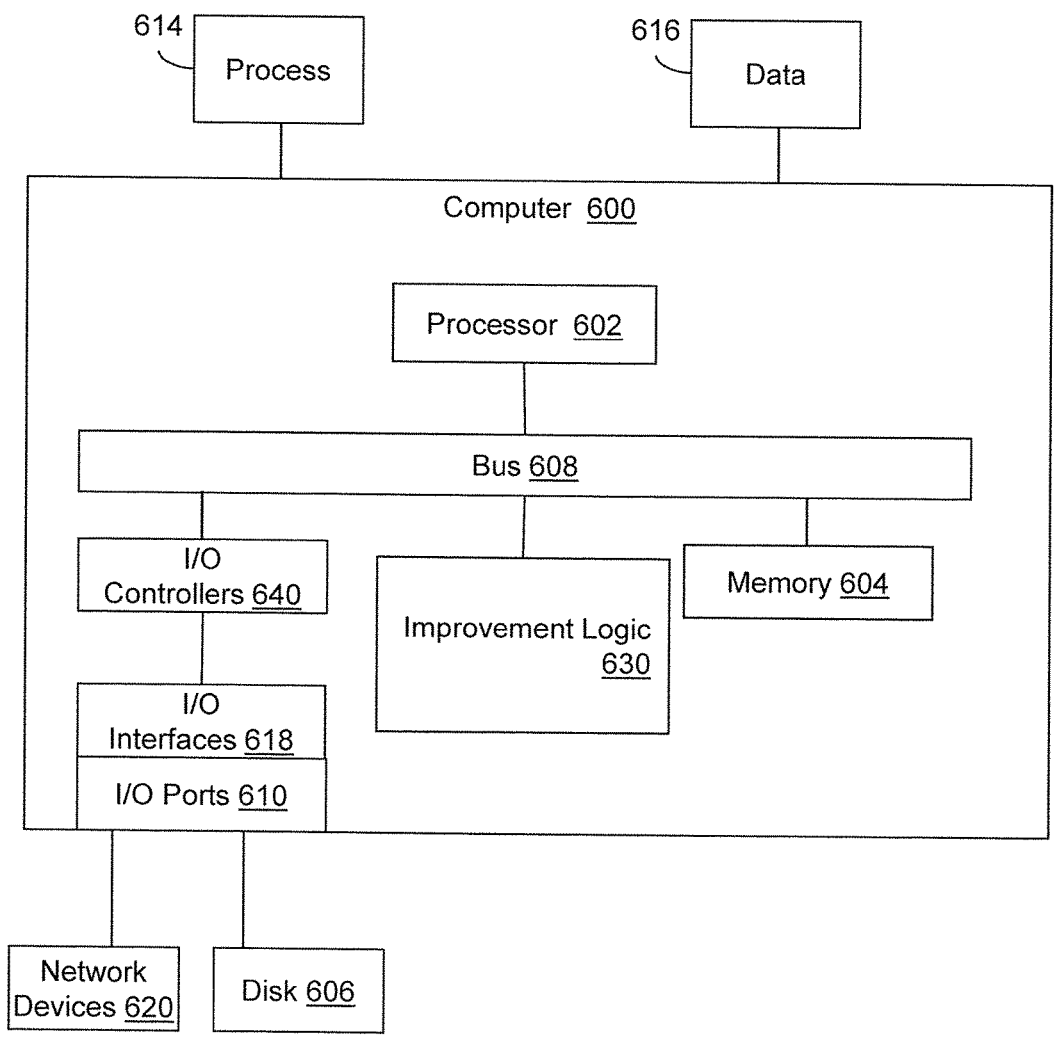
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include improvement logic 630 configured to generate tuning requests based on interactions with a search system and tune a search system in a manner similar to the improvement logic 110 shown in FIGS. 1-3. In different examples, the improvement logic 630 may be implemented in hardware, a non-transitory computer-readable medium with stored instructions, firmware, and/or combinations thereof. While the improvement logic 630 is illustrated as a hardware component attached to the bus 608, it is to be appreciated that in other embodiments, the improvement logic 630 could be implemented in the processor 602, stored in memory 604, or stored in disk 606.

In one embodiment, improvement logic 630 or the computer is a means (e.g., structure: hardware, non-transitory computer-readable medium, firmware) for performing the actions described in FIGS. 1-5. In some embodiments, the computing device may be a server operating in a cloud computing system, a server configured in a Software as a Service (SaaS) architecture, a smart phone, laptop, tablet computing device, and so on. In one embodiment, the improvement logic 130 is provisioned automatically in a knowledge cloud computing system through a hosting management system application.

The means may be implemented, for example, as an application specific integrated circuit (ASIC) programmed to perform the methods 400 of FIG. 4 and 500 of FIG. 5, as further explained in FIGS. 1-3. The means may also be implemented as stored computer executable instructions that are presented to computer 600 as data 616 that are temporarily stored in memory 604 and then executed by a processor 602.

Improvement logic 630 may also provide means (e.g., hardware, non-transitory computer-readable medium that stores executable instructions, firmware) for performing the methods 400 of FIG. 4 and 500 of FIG. 5, as further explained in FIGS. 1-3.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a compact disk-read only memory (CD-ROM) drive, a CD recordable (CD-R) drive, a CD read/write (CD-RW) drive, a digital video disc (DVD) ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and universal serial bus (USB) ports.

The computer 600 can operate in a network environment and thus may be connected to the network devices 620 via the I/O interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a computer cause the computer to:
   receive interaction data that describes an interaction with a search system, where the search system includes a search engine configured to process search queries to return results comprising a ranked set of documents that are relevant to respective search queries;
   identify a search query to be used as a basis for search engine tuning based on at least the interaction data;
   transmit request data describing a tuning request for the identified search query to a search query tuning system;
   in response to the tuning request received by the search query tuning system of the search system, modify a tuning search engine with a modification to create a modified tuning search engine, wherein
   (i) the modification is with respect to a first search query,
   (ii) the modified tuning search engine returns a first modified result in response to the first search query, and
   (iii) the first modified result has a higher quality than a first result returned by the tuning search engine in response to the first search query;
   determine a second quality of a second result returned by the tuning search engine in response to a second search query, wherein the second quality is based on at least document data for one or more documents included in the second result;
   determine a second modified quality of a second modified result returned by the modified tuning search engine in response to the second search query, wherein the second modified quality is based on at least document data for one or more documents included the second modified result;
   compare the second quality to the second modified quality to produce a comparison result; and
   in response to the comparison result showing the second modified quality to be higher than the second quality, publish the modification to a production search engine.

2. The non-transitory computer-readable medium of claim 1, further comprising instructions configured to cause the computer to:
   receive interaction data describing a search result rating assigned to a search query by an entity that submitted the search query; and
   when the rating is less than a threshold, transmit request data describing the tuning request for the search query to the search query tuning system.

3. The non-transitory computer-readable medium of claim 1, further comprising instructions configured to cause the computer to:
receive interaction data describing a new entry that is added to a hierarchy, where the hierarchy is used by the search system to process the search queries;
generate a search query that includes the new entry; and
transmit request data describing the tuning request for the generated search query to the search query tuning system.

4. The non-transitory computer-readable medium of claim 1, further comprising instructions configured to cause the computer to:
receive interaction data describing which documents in a set of documents returned in response to a search query were clicked by an entity that submitted the search query; and
when the documents that were clicked have a ranking in the set of documents below a threshold, transmit request data describing the tuning request for the search query to the search query tuning system.

5. The non-transitory computer-readable medium of claim 1, further comprising instructions configured to cause the computer to:
record data describing each search query submitted to the search system;
identify a set of frequent search queries that were submitted more than a threshold number of times; and
transmit context data describing the frequent search queries to the search query tuning system for use in tuning the search system with respect to search queries similar to search queries in the set of frequent search queries.

6. The non-transitory computer-readable medium of claim 1, further comprising instructions configured to cause the computer to:
add the identified search query to a set of search queries that are candidates for use as a basis for search engine tuning; and
collect document data for each document returned in response to search queries submitted to the search system, where document data for a document describes interactions with the document by an entity that submitted a search query that returned the document.

7. The non-transitory computer-readable medium of claim 6, where the document data comprises a number of times the document was clicked in response to being returned by the search system as a result to a search query.

8. The non-transitory computer-readable medium of claim 6, where the document data comprises a number of times the document was linked to a case by an entity that entered a search query that returned the document, where the case comprises data describing an incident that includes communication of information in the document from the entity to a third party.

9. A computing system, comprising:
a search system;
a search query tuning system, comprising:
task logic configured to:
receive interaction data that describes an interaction with a search system, where the search system includes a production search engine configured to process search queries to return results comprising a ranked set of documents that are relevant to respective search queries; and
identify a first search query to be used as a basis for search engine tuning based on at least the interaction data;
tuning logic configured to modify a tuning search engine with a modification to produce a modified tuning search engine that returns a result comprising a set of documents in response to the first search query, where the result returned by modified tuning search engine is different than a result returned by the tuning search engine in response to the first search query; and
change analysis logic configured to:
determine a first quality of a first set of ranked documents returned in response to a second search query submitted to the tuning search engine;
determine a second quality of a second set of ranked documents returned in response to the second search query submitted to the modified tuning search engine;
compare the first quality to the second quality to produce a comparison result; and
a synchronizer configured to make the modification of the modified tuning engine to the production search engine, wherein the making the modification is determined based on the comparison result.

10. The computing system of claim 9, where the task logic is further configured to:
receive interaction data describing which documents in a set of documents returned in response to a search query were clicked by an entity that submitted the search query; and
when the documents that were clicked have a ranking in the set of documents below a threshold, transmit request data describing a tuning request for the search query to the search query tuning system.

11. The computing system of claim 9, further comprising interaction analysis logic configured to:
record data describing each search query submitted to the search system;
identify a set of frequent search queries that were submitted more than a threshold number of times; and
transmit context data describing the frequent search queries to the search query tuning system for use in tuning the search system with respect to search queries similar to search queries in the set of frequent search queries.

12. The computing system of claim 9, further comprising:
interaction analysis logic configured to collect document data for each document returned in response to search queries submitted to the search system, where document data for a document describes interactions with the document by an entity that submitted a search query that returned the document.

13. A computer-implemented method, comprising:
receiving interaction data that describes an interaction with a search system, where the search system includes a production search engine configured to process search queries to return results comprising a ranked set of documents that are relevant to respective search queries;
identifying a first search query to be used as a basis for search engine tuning based on at least the interaction data;
transmitting request data describing a tuning request for the first search query to a search query tuning system,
in response to the tuning request for the identified search query, the search query tuning system adds the first search query to a set of search queries that are candidates for use as a basis for search engine tuning;
collecting document data for each document returned in response to search queries submitted to the search system, where document data for a document describes interactions with the document by an entity that submitted a search query that returned the document;

tuning the production search engine with respect to the first search query by modifying a tuning search engine to produce a modified tuning search engine that returns a result comprising a set of documents in response to the search query, where the result returned by modified tuning search engine is different than a result returned by the tuning search engine in response to the search query;

submitting a second search query to the tuning search engine;

determining a first quality of a first set of ranked documents returned in response to the second search query based on at least document data for the documents in the first set;

submitting the second search query to the modified tuning search engine;

determining a second quality of a second set of ranked documents returned in response to the second search query based on at least document data for the documents in the second set;

comparing the first quality to the second quality to produce a comparison result; and subsequently modifying the production search engine based at least in part on the comparison result.

14. The computer-implemented method of claim 13, further comprising:

receiving interaction data describing a search result rating assigned to a search query by an entity that submitted the search query; and when the rating is less than a threshold, transmitting request data describing a tuning request for the search query to the search query tuning system.

15. The computer-implemented method of claim 13, further comprising:

receiving interaction data describing a new entry that is added to a hierarchy, where the hierarchy is used by the search system to process the search queries;

generating a search query that includes the new entry; and transmitting request data describing a tuning request for the generated search query to the search query tuning system.

16. The computer-implemented method of claim 13, further comprising:

receiving interaction data describing which documents in a set of documents returned in response to a search query were clicked by an entity that submitted the search query; and when the documents that were clicked have a ranking in the set of documents below a threshold, transmitting request data describing a tuning request for the search query to the search query tuning system.

17. The computer-implemented method of claim 13, further comprising:

recording data describing each search query submitted to the search system;

identifying a set of frequent search queries that were submitted more than a threshold number of times; and transmitting context data describing the frequent search queries to the search query tuning system for use in tuning the search system with respect to search queries similar to search queries in the set of frequent search queries.

18. The computer-implemented method of claim 13 where the document data comprises a number of times the document was clicked in response to being returned by the search system as a result to a search query.

19. The computer-implemented method of claim 13 where the document data comprises a number of times the document was linked to a case by an entity that entered a search query that returned the document, where the case comprises data describing an incident that includes communication of information in the document from the entity to a third party.

* * * * *